(12) United States Patent
Khobragade et al.

(10) Patent No.: US 11,977,519 B1
(45) Date of Patent: May 7, 2024

(54) MULTISTREAM METADATA VERIFICATION FOR A DEDUPLICATION SYSTEM

(71) Applicant: Dell Products L.P., Round Rock, TX (US)

(72) Inventors: Shashank Prakash Khobragade, Nagpur (IN); Santi Gopal Mondal, Bangalore (IN); Kalyan Gunda, Bellandur (IN)

(73) Assignee: Dell Products L.P., Round Rock, TX (US)

( * ) Notice: Subject to any disclaimer, the term of this patent is extended or adjusted under 35 U.S.C. 154(b) by 47 days.

(21) Appl. No.: 17/988,958

(22) Filed: Nov. 17, 2022

(51) Int. Cl.
*G06F 16/17* (2019.01)
*G06F 11/14* (2006.01)
*G06F 16/174* (2019.01)

(52) U.S. Cl.
CPC ...... *G06F 16/1752* (2019.01); *G06F 11/1435* (2013.01); *G06F 11/1453* (2013.01)

(58) Field of Classification Search
CPC ............. G06F 16/1752; G06F 11/1345; G06F 11/1453
See application file for complete search history.

(56) References Cited

U.S. PATENT DOCUMENTS 10,795,812 B1* 10/2020 Duggal ................... G06F 3/067
2018/0275902 A1* 9/2018 Monday ................ G06F 3/0632

* cited by examiner

*Primary Examiner* — Loc Tran
(74) *Attorney, Agent, or Firm* — Dergosits & Noah LLP; Todd A. Noah

(57) ABSTRACT

Described is a system (and method) for efficient metadata verification when leveraging multi-streams as part of data deduplication system. The system may efficiently perform metadata integrity verification by dynamically invoking multi-streaming to leverage parallelization for metadata verification. Accordingly, the system may better utilize bandwidth and processing capabilities to reduce verification time.

20 Claims, 6 Drawing Sheets

MULTISTREAM METADATA VERIFICATION FOR A DEDUPLICATION SYSTEM

TECHNICAL FIELD

This disclosure relates to managing data deduplication systems, and more particularly, verifying metadata when storing deduplicated data.

BACKGROUND

Data storage systems (or on-demand storage services) may provide various tools that are crucial for enterprise level network clients. For example, clients may rely on such systems to efficiently back up and recover data in the event of user error, data loss, system outages, hardware failure, or other catastrophic events to allow business applications to remain in service or quickly come back up to service. For data protection purposes, it may be necessary to replicate and/or migrate data from a source storage to a target storage. For example, data may be migrated from a local storage to a cloud-based storage for long term retention. In addition, to further reduce storage costs, data deduplication may be employed. Data deduplication refers to a set of techniques for eliminating duplicated copies of repeated data. As a result, deduplication may improve storage utilization and reduce the amount of data to be transferred, for example, during a migration process.

In addition, as part of a migration process, data protection systems may also employ data invulnerability techniques to ensure the integrity of data including the integrity of metadata, which is critical for data protection systems employing data deduplication. However, as the rate of data deduplication employed by a system increases, the accompanying metadata also increases, This naturally increases the time required to verify the integrity of the metadata, and thus, the overall time required for migration. Accordingly, there is a continued need to develop efficient mechanisms to verify the integrity of metadata as part of data migration workflow associated with deduplicated data protection systems.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
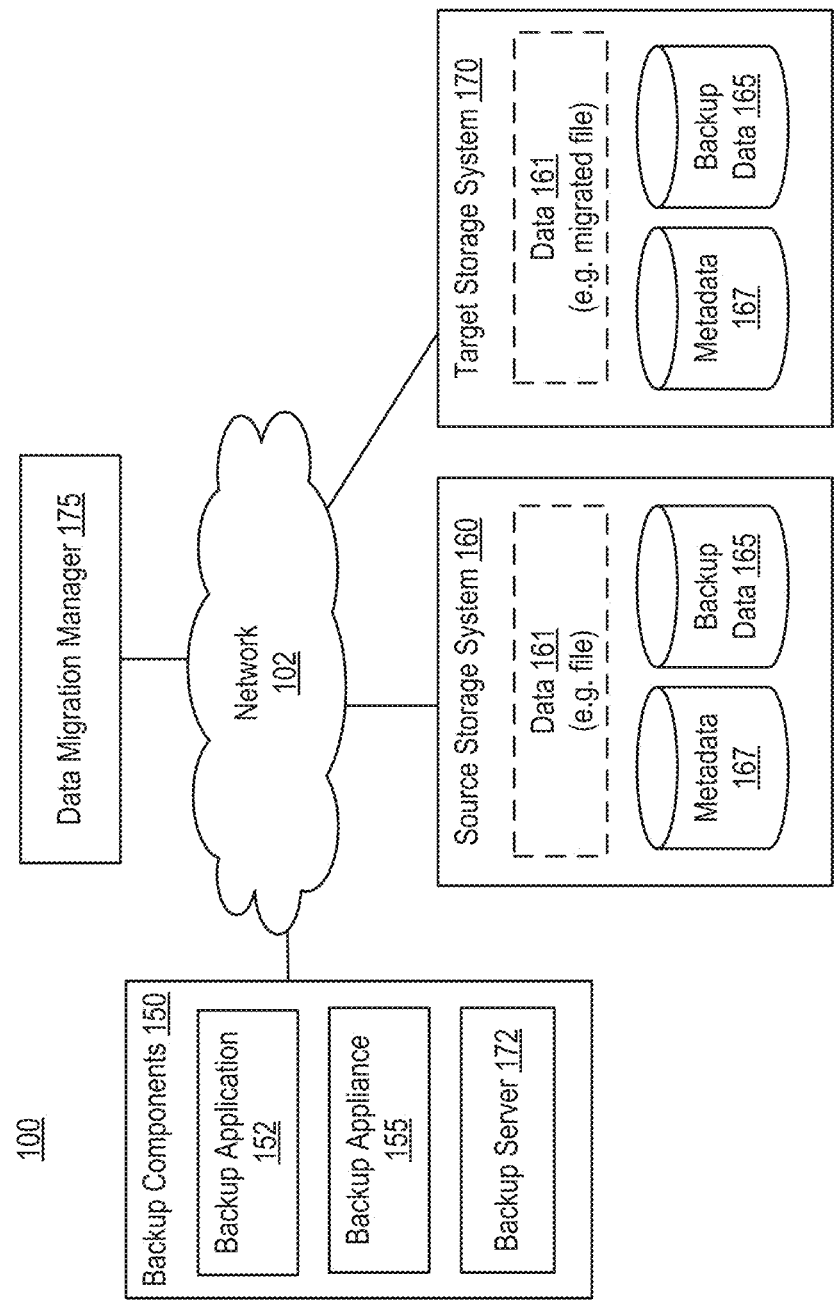
FIG. 1 is a block diagram illustrating an example of an operating environment that may be used in conjunction with one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for efficient metadata verification when leveraging multi-streams as part of data deduplication system. The system may efficiently perform metadata integrity verification by dynamically invoking multi-streaming to leverage parallelization for metadata verification. Accordingly, the system may better utilize bandwidth and processing capabilities to reduce verification time. In addition, in some embodiments, the system may invoke the multi-streaming in a dynamic manner, for example, when system resources are underutilized to further ensure multi-streaming is not outweighed by the costs for parallelization.

As further described herein, the system may be implemented as part of a data deduplication storage system. In general, deduplication involves dividing a file into segments which are then checked for redundancy with existing segments of other files already stored by the system. In other words, deduplication allows the same data segments to be referenced by different files. The data segments are referenced via metadata segments which may be stored as part of a segment tree. A reference handle, or content handle, references the segment tree that includes the metadata segments and the data segments, and thus, may be used to access the contents of the file. The data segments form the leaf nodes (or leaf level) of the tree. The segment tree may be in the form of Merkle tree to allow the system to store a hash (e.g., cryptographic hash) at each node of the tree, which is in turn, derived from the hash values of the children of that node. The hash value for a leaf node is derived from the file data segment itself. As further described herein, for data segments, a checksum is computed before a write (or copy, or migration) and is compared to a checksum that is re-computed after the write. Accordingly, the integrity of metadata is verified by re-computing the hash value for the whole tree, via a bottom-up traversal, and comparing it to the hash value stored in root. Metadata integrity for each file may need to be verified before a file migration is deemed successful. However, the verification time is proportional to the size of the segment tree, which in turn is proportional to the size of the file. Accordingly, the larger the file, the longer verification takes. Moreover, higher generation of backups tend to have higher data and metadata deduplication ratios. In other words, increases of metadata deduplication often causes poor locality of the metadata segments, which in turn also increases the verification time. To address these concerns, embodiments of the system as described herein, aim to efficiently manage a file migration workflow within a deduplicated storage environment.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g., Solid State Drive (SSD), Hard Disk Drive (HDD)), which may include virtual storage systems provided by a cloud service provider.

More specifically, and with reference to FIG. 1, shown is a block diagram illustrating an example of an operating environment that may be used in conjunction with one or more embodiments of the disclosure.

As shown, the environment 100 may include a source (or primary) storage system 160, a target (or secondary) storage system 170, backup components 150, and a data migration manager 175. The source storage system 160 and/or the target storage system 170 may be referred to as the deduplication storage system. It should be noted that the components of operating environment 100 may interact via a network 102, which may be any type of wired or wireless network including a local area network (LAN), a wide area network (WAN), or a direct communication link, or other suitable connection.

In some embodiments, components of the operating environment 100 may provide deduplicated data protection and recovery services to a client (or customer). As further described herein data 161 (e.g., a file) stored on the source storage system 160 may be migrated to the target storage system 170. The backup data 165 and/or data 161 may be associated with metadata 167 that is also stored by the storage systems 160/170.

The metadata 167 may include fingerprints (e.g., hash values) contained within backup data 165, where data represents containers, which contains one or more compression regions (CRs) of one or more data chunks, CRs, or data chunks. Each data chunk is a fragment of data block and data chunks are processed and stored in the deduplicated storage system. Fingerprints are mapped to particular data via metadata 167, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. In one embodiment, metadata 167 may include a file name, a storage unit identifier (ID) identifying a storage unit in which the chunks associated with the file name are stored, reconstruction information for the file using the chunks, and any other appropriate metadata information.

The backup components 150 may include a backup application 152 that performs (or manages, coordinates, etc.) the creation and recovery (or restoration) of data 161 that may be backed-up. For example, data 161 to be backed-up may be communicated to the backup application 152 for initial processing, after which the processed data is uploaded from the backup application 152 for storage within storage system 160/170. In some embodiments, the backup application 152 may cooperate with a backup client application to back up data. In some embodiments, the backup application 152 may be a part of, or work in conjunction with, a backup appliance 155. For example, the backup (or storage) appliance 155 may include a Dell EMC CloudBoost appliance, although any suitable appliance is contemplated. In addition, the backup components 150 may include one or more of a backup server 172 that may be implemented in conjunction with a Data Domain deduplication storage server provided by Dell EMC for use with Data Domain™ Restorer (DDR) storage devices. In some embodiments, the backup server 172 may be a Dell EMC Avamar server or a Dell EMC Networker server, although no particular server is required, and other backup and storage system configuration are contemplated. It should be noted that the backup components 150 (e.g., backup application 152, backup appliance 155, or backup server 172) can be implemented in various forms, such as a virtual, physical, or native public cloud appliance to fit the requirements of a particular configuration, and the backup application 152 can be used with various types of data protection environments, including public and private object storage clouds.

As shown, the operating environment 100 may include a source storage system 160, and a target storage system 170. For example, the source storage system 160 may be part of a production environment (or production system), and the target storage system 170 may be part of a disaster recovery environment, both of which may provide data protection and recovery (or disaster recovery) services to a client (or customer). In some embodiments, the target storage system 170 may be a remote storage system (e.g., remote from the source storage system 160). For example, the source storage system 160 may be an on-premises system and the target storage system 170 may be part of a cloud-based system (or service). In some embodiments, the source storage system 160 may also be provided as part of a cloud-based system (or service). However, in such scenarios, an entity (e.g., cloud service provider) providing the source storage system 160 may be different than the entity (or entities) providing the target storage system 170. For example, the source storage system 160 may use underlying storage hardware provided (or managed) by a data protection and backup service provider (e.g., Dell EMC), whereas the underlying storage hardware for the target storage system 170 may be provided by a different cloud-based provider for storage services (e.g., Amazon Web Services (AWS), or Microsoft Azure).

The target storage system 170 may be configured to provide replication (or recovery, mirroring, etc.) capabilities for the source storage system 160. As shown, the target storage system 170 may also backup data 165 and metadata 167. In some embodiments, data 161 and/or backup data 165 stored on the source storage system 160 may be replicated (or migrated) to provide a corresponding recovery backup data 165 that is stored on the target storage system 170.

Although shown as a separate component, the data migration manager 175 may be part of, or work in conjunction with, storage systems 160/170 (e.g., the deduplication storage system). As further described herein, a data migration manager 175 may coordinate (or manage, orchestrate, execute, automate, etc.) various operations (or processes, methods, etc.) for a migration workflow as further described herein. In addition, the data manager 175 may be part of, or work in conjunction with, the backup components 150. In addition, in some embodiments, the data manager 175 may direct (or control, initiate, etc.) other components of the operating environment 100, such as the source storage system 160, to perform various operations.

Figure 2:
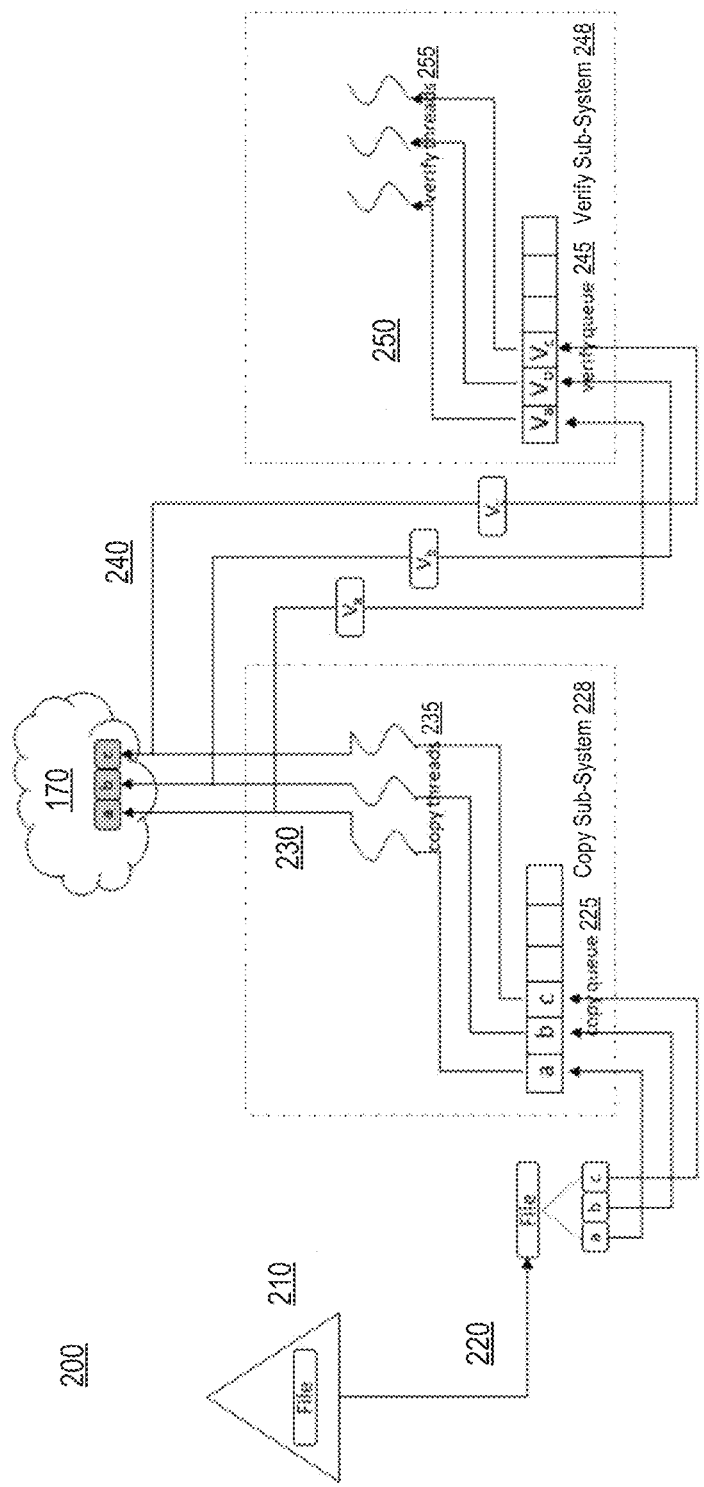
FIG. 2 is a process flow diagram illustrating an example overview of a process flow for multi-streamed copy and verification of file regions according to one or more embodiments of the disclosure.

FIG. 2 is a process flow diagram illustrating an example overview of a process flow for multi-stream copy and verification of file regions according to one or more embodiments of the disclosure. Process 200 may use processing logic, which may include software, hardware, or a combination thereof. For example, process 200 may be performed by a system including one or more components described in operating environment 100.

As shown, at operation 210, the system may identify a file that is data migration eligible. For example, the system may determine whether the file stored on a source (or primary) storage system is to be migrated (or copied, offloaded, etc.) to a target (or secondary) storage system 170. In some embodiments, the file may be migrated to improve performance or reduce storage costs. In some embodiments, once a file is migrated (i.e., copied) to the target storage system, the file may be deleted (or removed) from the source storage system. For example, a file may be migrated from a source storage system (e.g., local storage) to a target storage system (e.g., cloud-based storage) for long term data retention.

Once the system determines the file is to be migrated, at operation 220, the system may divide the file into regions for multi-streamed copying to the target storage system. When dividing the file, the system may determine the number of regions dynamically based on one or more criteria. The criteria may include a size of the file. For example, based on the size of the file, the system may determine the number of regions (e.g., the larger the file, the more regions). The criteria may also include a number of available copy threads (or streams) 235. For example, if the system determines X number of copy threads 235 are available, the system may divide the file into X, at least X, or a number divisible by X, number of regions. The criteria may also include a setting for a number of file regions. For example, the setting may include a preferred maximum, minimum, or average number of regions for dividing a file that is determined based on efficiency metrics (e.g., statistical migration information).

As shown, one or more of the regions of the file may be added to a copy queue 225 that may be managed as part of a copy sub-system 328. Accordingly, at operation 230, the system (e.g., via the copy sub-system 228) copies the regions to the target storage system 170 via copy threads 235. The copy threads 235 may be multi-streamed, and thus, allow for the copying one or more of the regions to the target storage system 170 in parallel (or simultaneously, at the same time, etc.). For instance, in this example, regions "a", "b", and "c" of the file may be copied in parallel. In some embodiments, the system may dynamically determine whether to invoke (or initiate, execute, etc.) a multi-stream (i.e., parallel) copying based on resource utilization. For example, the system may determine if there are sufficient resources (e.g., available bandwidth, processing power, etc.) to perform a multi-stream operation. If so, the system may invoke a multi-stream operation. In addition, the system may determine the number of copy threads 235 (e.g., parallel operations to invoke) based on the resource utilization. For example, if the system determines that three copy threads 235 are available (e.g., as shown in this example), the system may initiate a copy by selecting three regions from the copy queue 225 to be copied in parallel by the copy threads 235. Thus, copy threads 235 may copy the file to the target storage system 170. To confirm the integrity of the copy operation, the system may initiate a verification operation at 240 to verify the metadata of the regions (or region metadata).

As shown, metadata of the regions of the file may be added to a verify queue 245 that may be managed as part of a verify sub-system 248. Accordingly, at operation 250, the system (e.g., via the verify sub-system 248) verifies the integrity of the metadata for each of the regions of the file via verify threads 255. As with the copy threads 235, the verify threads 255 may be multi-streamed, and thus, allow for verifying metadata of one or more regions in parallel (or simultaneously, at the same time, etc.). For instance, in this example, metadata for regions "a", "b", and "c" of the file may be verified in parallel. In some embodiments, the system may dynamically determine whether to invoke (or initiate, execute, etc.) a multi-stream (i.e., parallel) verification based on resource utilization. For example, the system may determine if there are sufficient resources (e.g., available bandwidth, processing power, etc.) to perform a multi-stream operation. If so, the system may invoke a multi-stream operation. In addition, the system may determine the number of verify threads 255 (e.g., parallel operations to invoke) based on the resource utilization. For example, if the system determines that three verify threads 255 are available (e.g., as shown in this example), the system may initiate a verification by selecting three metadata regions from the verify queue 245 to be verified in parallel by the verify threads 255.

The system may verify metadata regions individually before stitching (or combining) them together to synthesize the file (file synthesis is further described below). The metadata generated for (or associated with) each region may include a region level segment tree. In addition, the metadata generated for each region may include a region level content handle. Each verify thread verifies the integrity of the region metadata by using a checksum. More particularly, each of the verify threads may compute (e.g., re-compute) the checksum for its assigned metadata region by parsing the region level segment tree bottom up and performing a comparison with a previously computed checksum (e.g., prior to region migration). The previously computed checksum may be stored in the parent segment. In some embodiments, once the verification is completed for a region, the region and/or region metadata region may be stored as part of a temporary data structure and/or memory (e.g., cache). The stored information may then be efficiently accessed (e.g., with lower latency) during the file synthesis operation as further described with respect to FIG. 3.

Figure 3:
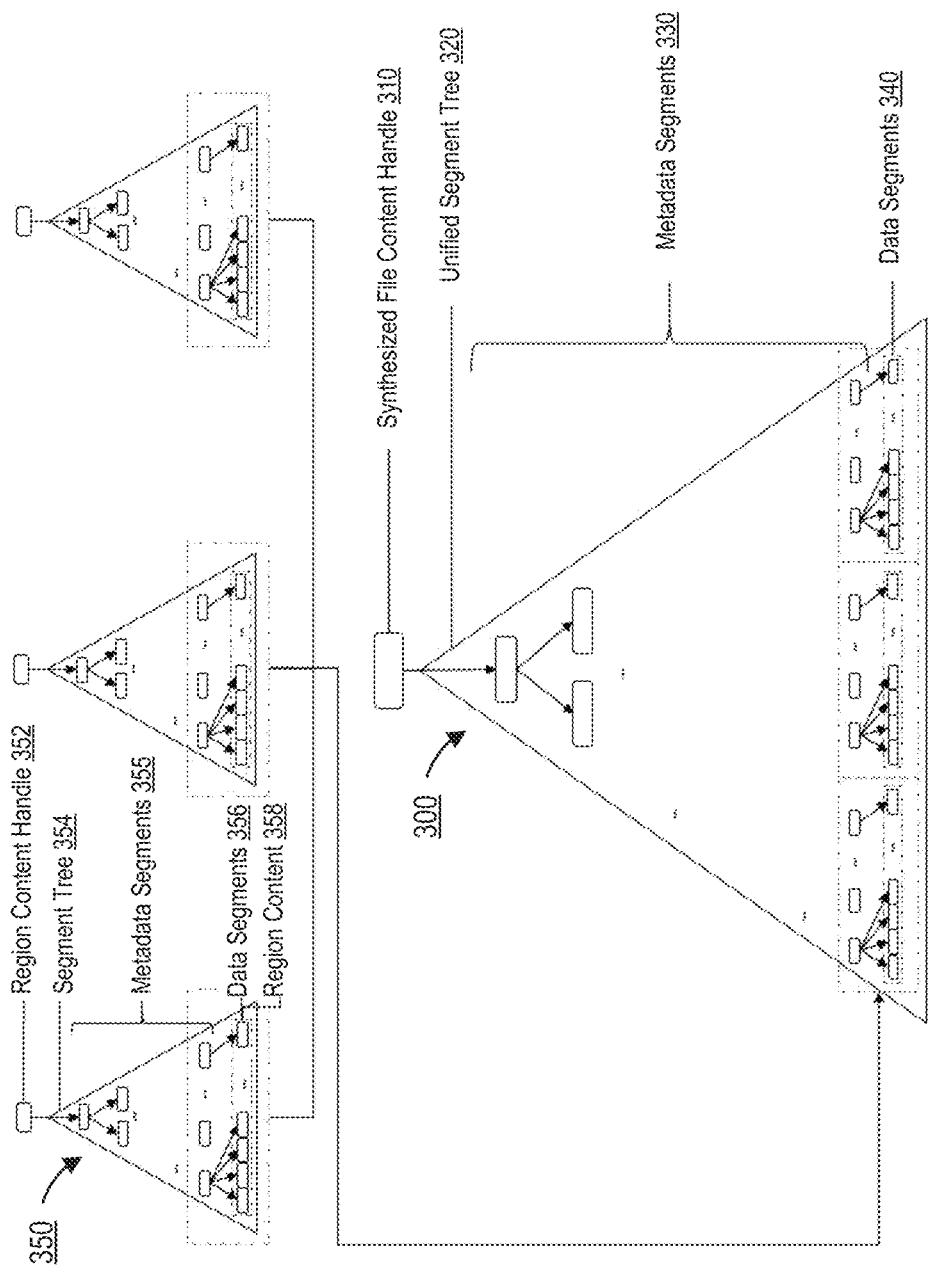
FIG. 3 is a diagram illustrating an example data configuration used to synthesize a file from file regions according to one or more embodiments of the disclosure.

FIG. 3 is a diagram illustrating an example data configuration used to synthesize a file from file regions according to one or more embodiments of the disclosure. In some embodiments, due to utilizing multi-streaming, a file synthesis operation may be necessary to further verify the data migration. For example, if a multi-streamed copy operation was performed, file synthesis may be employed to verify the integrity of data because the region level segment trees are generated after the copy operation (e.g., generated from new data stored on the target storage system). The file synthesis operation may occur after all of the regions of a file are verified (e.g., as described earlier in operation 250). By combining (e.g., stitching) all of the regions of together, the system may "synthesize" (or recreate, reconstitute, etc.) the migrated file.

As shown, each region 350 may be identified by a region content handle 352, and represented by a region segment tree 354. The region segment tree 354 may include metadata segments 355 and data segments 356. The data segments 356 of the region segment tree 354 are the leaf nodes and may form the region content 358.

As shown, the synthesized file 300 may be identified by a synthesized (or stitched) file content handle 310, and represented with a unified segment tree 320. The unified segment tree 320 may include metadata segments 330 and data segments 340. The data segments 340 are the leaf nodes of the tree 320. The data segments 340 of the unified segment tree 320 may correspond to the data segments 356 (that form region content 358) of the combined region segment trees 354. Accordingly, the synthesized file 300 may be generated from the regions. More specifically, the data segments 356 and their parent nodes, which are part the bottom level of the metadata segments 355, for all of the regions may be used to generate the rest of the unified segment tree 320 for the synthesized file 300. In other words, the leafs nodes and their parents of all of the region segment trees 354 is all that is required to generate the synthesized file 300. In addition, the synthesized file 300 may be generated without rearranging the data segments 356 of the collection of region segment trees 354. Thus, the synthesized file content handle 310 may provide access to the data of the entire file via the unified segment tree 320 that is formed by combining (or stitching) the bottom two levels (e.g., last metadata level, and data segment (or region content) level) of the region segment trees.

Figure 4:
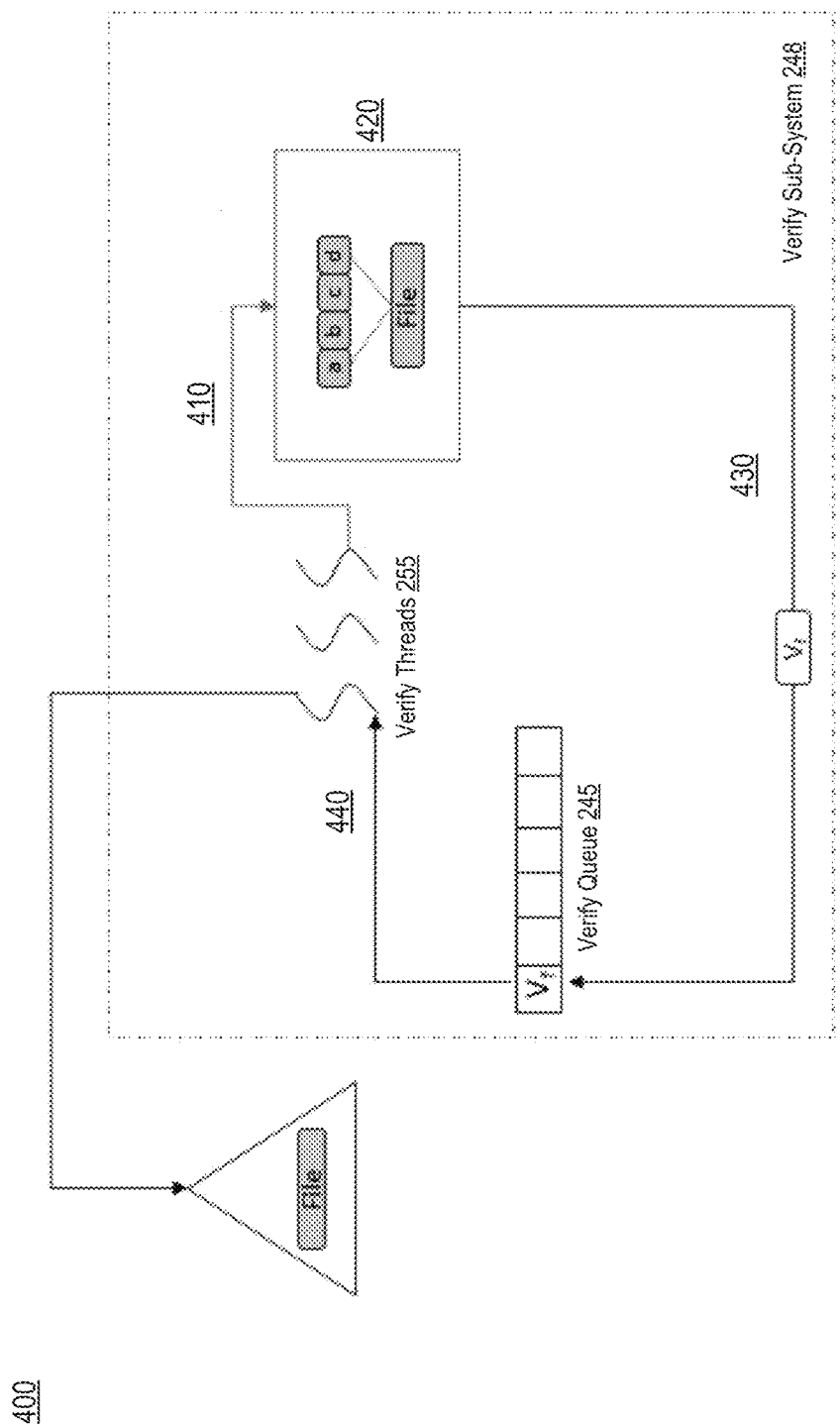
FIG. 4 is a process flow diagram illustrating an example overview of a process flow to verify the integrity of a synthesized file according to one or more embodiments of the disclosure.

Once the file is synthesized, the system may then verify the integrity of the synthesized file 300 as further described with respect to FIG. 4.

FIG. 4 is a process flow diagram illustrating an example overview of a process flow to verify the integrity of a synthesized file according to one or more embodiments of the disclosure. Process 400 may use processing logic, which may include software, hardware, or a combination thereof. For example, process 400 may be performed by a system including one or more components described in operating environment 100.

As shown, in operation 410, file synthesis may commence. In some embodiments, the region to get processed last for region verification may initiate the synthesis. In operation 420, the bottom two levels of the region segment tree (e.g., region segment tree 354) are used to "stitch" or synthesize the file to create a unified segment tree (e.g., unified segment tree 320). The bottom two levels of the region segment tree include the region data segments (e.g., data segments 356), or leafs nodes of the region segment tree, and its parent nodes, or bottom level of the metadata segments (e.g., metadata segments 355) of the region segment tree. In operation 430, a verification of synthesized file is then added to the verify queue 245 of the verify subsystem 248. Accordingly, the verify threads 255 may then (e.g., using a multi-stream approach as described above) verify the metadata of the unified segment tree. However, the system may efficiently leverage characteristics of the tree structure such that it may skip verification of some of the segments. As described, the bottom two levels of the unified segment tree have already been verified as part of the region metadata verification (e.g., operation 250 described above). Accordingly, verification of this portion of the unified segment tree may be skipped. In other words, verification of the unified segment tree (e.g., a verification traversal of the tree) may commence from the level above the last (or bottom) metadata segment level. Notably, the number of segments increases at each level by a factor of N, where N is the fanout for nodes based on a traversal from the top down. Thus, by foregoing (or skipping) verification of this portion of the unified segment tree, the system may significantly reduce the verification time, and thus, the migration process overall.

Figure 5:
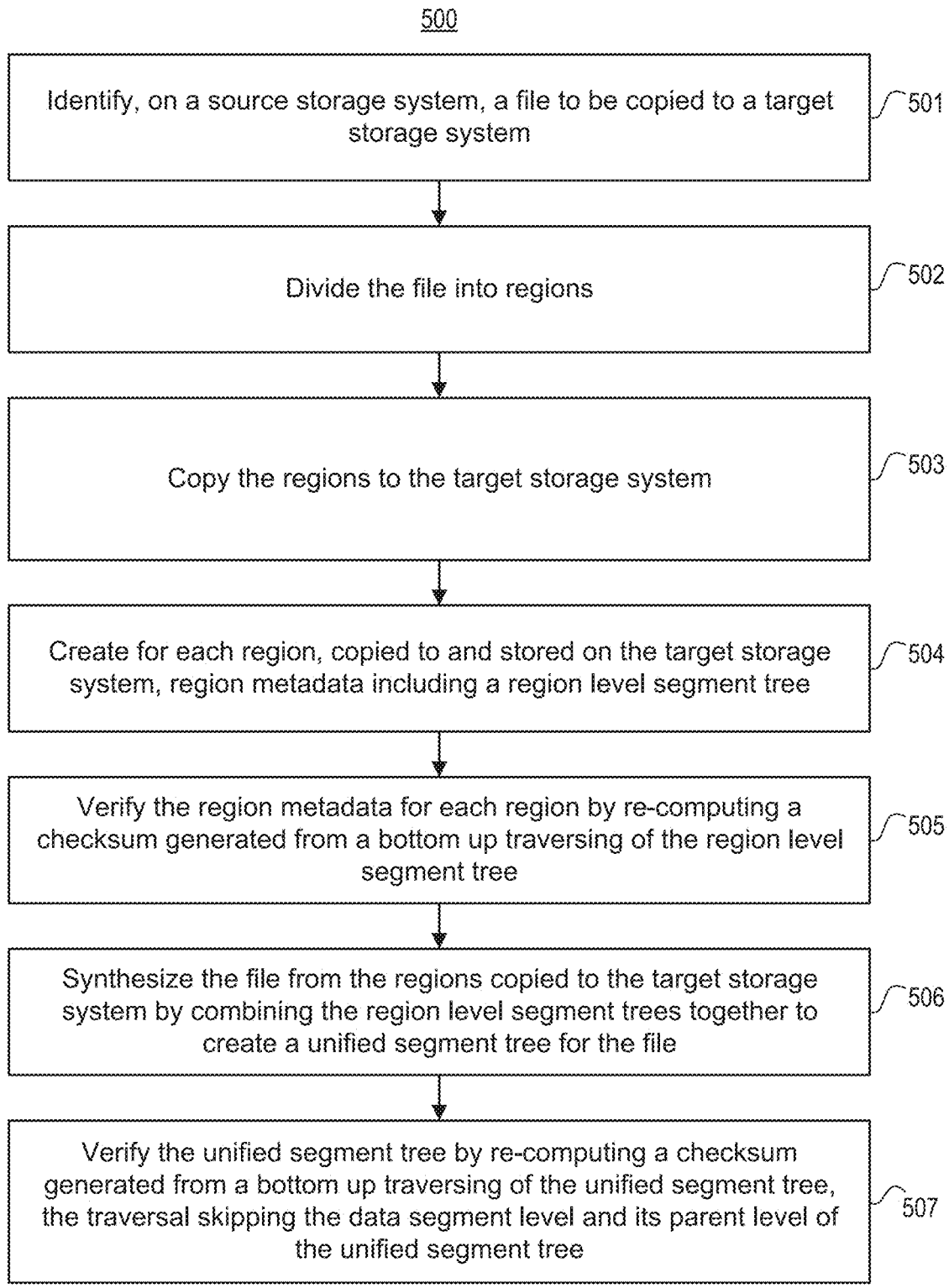
FIG. 5 is a flow diagram illustrating an example method of migrating and synthesizing a file to a target storage system according to one or more embodiments of the disclosure.

FIG. 5 is a flow diagram illustrating an example method of migrating and synthesizing a file to a target storage system according to one or more embodiments of the disclosure. Process 500 may use processing logic, which may include software, hardware, or a combination thereof. For example, process 500 may be performed by a system including one or more components described in operating environment 100.

In 501, the system (e.g., data migration manager 175) may identify, on a source storage system, a file to be copied to a target storage system.

In 502, the system may divide the file into regions. Dividing the file into regions may be based on one or more factors such as a size of the file, a number of available copy streams, and a setting for a number of file regions.

In 503, the system copies the regions to the target storage system. The regions may be copied in response to (or as a result of) adding each region to a copy queue. In some embodiments, copying the regions to the target storage system includes copying one or more regions of the copy queue in parallel to the target storage system. Copying the one or more regions of the copy queue in parallel to the target storage system may be performed in response to determining that one or more resources associated with the copy queue are underutilized.

In 504, the system may create for each region, copied to and stored on the target storage system, region metadata including a region level segment tree. The region metadata may also include a region content handle.

In 505, the system may verify the region metadata for each region by re-computing a checksum generated from a bottom-up traversing of the region level segment tree. The region metadata for reach region may be verified in response to (or as a result of) adding the region metadata for each region to a verify queue.

In 506, the system may synthesize the file from the regions copied to the target storage system by combining the region level segment trees together to create a unified segment tree for the file.

In some embodiments, synthesizing the file from the regions copied to the target storage system includes using the data segment level and their parent level of the region segment trees to generate the remainder of the unified segment tree.

In some embodiments, synthesizing the file from the regions copied to the target storage system is initiated in response to determining the integrity of the region metadata for a last region of the file has been verified.

In 507, the system may verify the unified segment tree by re-computing a checksum generated from a bottom-up traversing of the unified segment tree, the traversal skipping the data segment level and its parent level of the unified segment tree. In other words, the verifying includes re-computing the checksum generated from a bottom-up traversal commencing from the level above the last metadata level of the unified segment tree. The unified segment tree may be verified in response to (or as a result of) adding metadata of the unified segment tree to the verify queue. More specifically, the unified segment tree may be verified in response to (or as a result of) adding a metadata verification request for the unified segment tree to the verify queue.

In some embodiments, verifying the region metadata for each region includes storing at least some of the region metadata in a cache, and verifying the unified segment tree includes retrieving the stored metadata from the cache when re-computing the checksum.

In some embodiments, a plurality of threads associated with the verify queue for at least one of verifying the region metadata and verifying the unified segment tree are executed in parallel. The plurality of threads associated with the verify queue may be executed in parallel in response to determining that one or more resources associated with the verify queue are underutilized. In some embodiments, a number of the plurality of threads associated with the verify queue are invoked dynamically based on the determination that one or more resources associated with the verify queue are underutilized.

Figure 6:
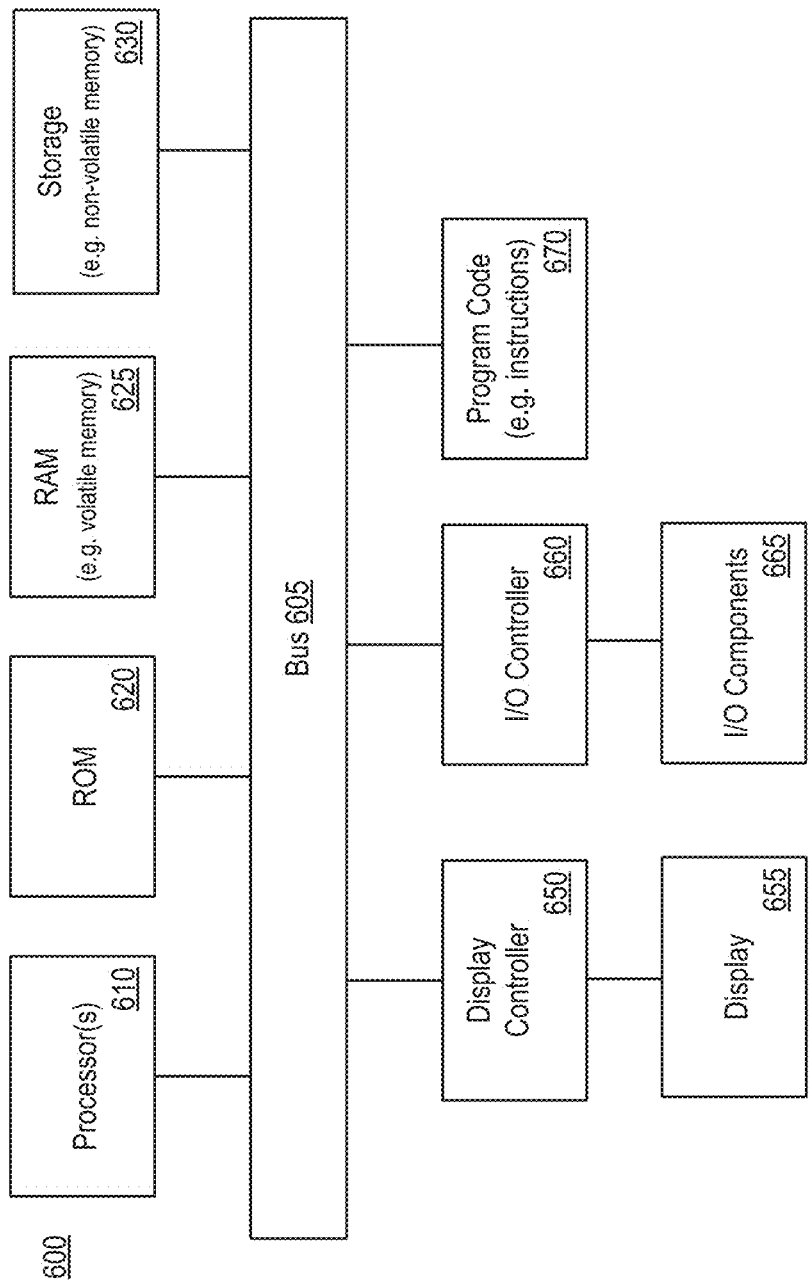
FIG. 6 is a block diagram illustrating an example computing system that may be used in conjunction with one or more embodiments of the disclosure.

FIG. 6 shows a block diagram of an example of a computing system that may be used in conjunction with one or more embodiments of the disclosure. For example, computing system 600 (or system, or server, or computing device, or device) may represent any of the devices or systems (e.g., storage systems 160/170, data migration manager 175, etc.) described herein that perform any of the processes, operations, or methods of the disclosure. Note that while the computing system 600 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 605 which may be coupled to a processor 610, ROM (Read Only Memory) 620, RAM (or volatile memory) 625, and storage (or non-volatile memory) 630. The processor(s) 610 may retrieve stored instructions from one or more of the memories 620, 625, and 630 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 610 may perform operations in an on-demand or "cloud computing" environment or as a service (e.g., within a "software as a service" (SaaS) implementation). Accordingly, the performance of operations may be distributed among the one or more processors 610, whether residing only within a single machine or deployed across a number of machines. For example, the one or more processors 610 may be located in a single geographic location (e.g., within a home environment, an office environment, or a server farm), or may be distributed across a number of geographic locations. The RAM 625 may be implemented as, for example, dynamic RAM (DRAM), or other types of memory that require power continually in order to refresh or maintain the data in the memory. Storage 630 may include, for example, magnetic, semiconductor, tape, optical, removable, non-removable, and other types of storage that maintain data even after power is removed from the system. It should be appreciated that storage 630 may be remote from the system (e.g., accessible via a network).

A display controller 650 may be coupled to the bus 605 in order to receive display data to be displayed on a display device 655, which can display any one of the user interface features or embodiments described herein and may be a local or a remote display device. The computing system 600 may also include one or more input/output (I/O) components 665 including mice, keyboards, touch screen, network interfaces, printers, speakers, and other devices. Typically, the input/output components 665 are coupled to the system through an input/output controller 660.

Program code 670 may represent any of the instructions, applications, software, libraries, toolkits, modules, components, engines, units, functions, logic, etc. as described herein (e.g., data migration manager 175, etc.). Program code 670 may reside, completely or at least partially, within the memories described herein (e.g., non-transitory computer-readable media), or within a processor during execution thereof by the computing system. Program code 670 may include both machine code, such as produced by a compiler, and files containing higher-level or intermediate code that may be executed by a computing system or other data processing apparatus (or machine) using an interpreter.

In addition, program code 670 can be implemented as software, firmware, or functional circuitry within the computing system, or as combinations thereof. Program code 670 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g., any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g., and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed, cause the one or more processors to:
   identify, on a source storage system, a file to be copied to a target storage system;
   divide the file into regions;
   copy, in response to adding each region to a copy queue, the regions to the target storage system;
   create for each region, copied to and stored on the target storage system, region metadata including a region level segment tree;
   verify, in response to adding the region metadata for each region to a verify queue, the region metadata for each region by re-computing a checksum generated from a bottom-up traversing of the region level segment tree;
   synthesize the file from the regions copied to the target storage system by combining the region level segment trees together to create a unified segment tree for the file; and
   verify, in response to adding metadata of the unified segment tree to the verify queue, the unified segment tree by re-computing a checksum generated from a bottom-up traversing of the unified segment tree, the traversal skipping the data segment level and its parent level of the unified segment tree.

2. The system of claim 1, wherein synthesizing the file from the regions copied to the target storage system includes using the data segment level and their parent level of the region segment trees to generate the remainder of the unified segment tree.

3. The system of claim 1, wherein verifying the region metadata for each region includes storing at least some of the region metadata in a cache, and wherein verifying the unified segment tree includes retrieving the stored metadata from the cache when re-computing the checksum.

4. The system of claim 1, wherein dividing the file into regions is based on one or more of a size of the file, a number of available copy streams, and a setting for a number of file regions.

5. The system of claim 1, wherein a plurality of threads associated with the verify queue for at least one of verifying the region metadata and verifying the unified segment tree are executed in parallel.

6. The system of claim 5, wherein the plurality of threads associated with the verify queue are executed in parallel in response to determining that one or more resources associated with the verify queue are underutilized.

7. The system of claim 6, wherein a number of the plurality of threads associated with the verify queue are invoked dynamically based on the determination that one or more resources associated with the verify queue are underutilized.

8. The system of claim 1, wherein copying the regions to the target storage system includes copying one or more regions of the copy queue in parallel to the target storage system.

9. The system of claim 7, wherein copying the one or more regions of the copy queue in parallel to the target storage system is performed in response to determining that one or more resources associated with the copy queue are underutilized.

10. The system of claim 1, wherein synthesizing the file from the regions copied to the target storage system is initiated in response to determining the integrity of the region metadata for a last region of the file has been verified.

11. A method comprising:
    identifying, on a source storage system, a file to be copied to a target storage system;
    dividing the file into regions;
    copying, in response to adding each region to a copy queue, the regions to the target storage system;
    creating for each region, copied to and stored on the target storage system, region metadata including a region level segment tree;
    verifying, in response to adding the region metadata for each region to a verify queue, the region metadata for each region by re-computing a checksum generated from a bottom-up traversing of the region level segment tree;

synthesizing the file from the regions copied to the target storage system by combining the region level segment trees together to create a unified segment tree for the file; and verifying, in response to adding metadata of the unified segment tree to the verify queue, the unified segment tree by re-computing a checksum generated from a bottom-up traversing of the unified segment tree, the traversal skipping the data segment level and its parent level of the unified segment tree.

12. The method of claim 11, wherein synthesizing the file from the regions copied to the target storage system includes using the data segment level and their parent level of the region segment trees to generate the remainder of the unified segment tree.

13. The method of claim 11, wherein verifying the region metadata for each region includes storing at least some of the region metadata in a cache, and wherein verifying the unified segment tree includes retrieving the stored metadata from the cache when re-computing the checksum.

14. The method of claim 11, wherein dividing the file into regions is based on one or more of a size of the file, a number of available copy streams, and a setting for a number of file regions.

15. The method of claim 11, wherein a plurality of threads associated with the verify queue for at least one of verifying the region metadata and verifying the unified segment tree are executed in parallel.

16. A computer program product comprising a non-transitory computer-readable medium having a computer-readable program code embodied therein to be executed by one or more processors, the program code including instructions to:

identify, on a source storage system, a file to be copied to a target storage system;

divide the file into regions;

copy, in response to adding each region to a copy queue, the regions to the target storage system;

create for each region, copied to and stored on the target storage system, region metadata including a region level segment tree;

verify, in response to adding the region metadata for each region to a verify queue, the region metadata for each region by re-computing a checksum generated from a bottom-up traversing of the region level segment tree;

synthesize the file from the regions copied to the target storage system by combining the region level segment trees together to create a unified segment tree for the file; and verify, in response to adding metadata of the unified segment tree to the verify queue, the unified segment tree by re-computing a checksum generated from a bottom-up traversing of the unified segment tree, the traversal skipping the data segment level and its parent level of the unified segment tree.

17. The computer program product of claim 16, wherein synthesizing the file from the regions copied to the target storage system includes using the data segment level and their parent level of the region segment trees to generate the remainder of the unified segment tree.

18. The computer program product of claim 16, wherein verifying the region metadata for each region includes storing at least some of the region metadata in a cache, and wherein verifying the unified segment tree includes retrieving the stored metadata from the cache when re-computing the checksum.

19. The computer program product of claim 16, wherein dividing the file into regions is based on one or more of a size of the file, a number of available copy streams, and a setting for a number of file regions.

20. The computer program product of claim 16, wherein a plurality of threads associated with the verify queue for at least one of verifying the region metadata and verifying the unified segment tree are executed in parallel.

* * * * *